(12) United States Patent
Busch et al.

(10) Patent No.: US 8,218,540 B1
(45) Date of Patent: Jul. 10, 2012

(54) MODIFYING A DUPLICATED PACKET AND FORWARDING ENCAPSULATED PACKETS

(75) Inventors: Dackary Ronald Busch, Veradale, WA (US); Kevin Q Daines, Liberty Lake, WA (US); Scott Daniel Wilsey, Mead, WA (US)

(73) Assignee: World Wide Packets, Inc., Spokane Valley, WA (US)

( * ) Notice: Subject to any disclaimer, the term of this patent is extended or adjusted under 35 U.S.C. 154(b) by 186 days.

(21) Appl. No.: 11/966,041

(22) Filed: Dec. 28, 2007

(51) Int. Cl.
*H04L 12/28* (2006.01)
*H04L 12/56* (2006.01)
*H04J 3/12* (2006.01)

(52) U.S. Cl. ........................ 370/389; 370/523

(58) Field of Classification Search ............... 370/389, 370/390, 392, 395.5, 395.53, 465, 466, 467, 370/469
See application file for complete search history.

(56) References Cited

U.S. PATENT DOCUMENTS

| | | | |
|---|---|---|---|
| 5,909,438 A * | 6/1999 | Melden et al. ............. | 370/388 |
| 7,065,080 B1 * | 6/2006 | Aznar et al. ............... | 370/390 |
| 7,304,956 B2 | 12/2007 | Lloyd et al. | |
| 7,522,543 B2 * | 4/2009 | Matityahu et al. .......... | 370/279 |
| 7,564,803 B1 * | 7/2009 | Minei et al. ............... | 370/390 |
| 7,778,259 B1 * | 8/2010 | Mahalingaiah ............ | 370/401 |
| 7,783,714 B2 * | 8/2010 | Hayer et al. ............... | 709/206 |
| 7,830,883 B1 * | 11/2010 | Fromm et al. .............. | 370/392 |
| 2001/0055274 A1 * | 12/2001 | Hegge et al. ............... | 370/229 |
| 2003/0223376 A1 | 12/2003 | Elliott et al. | |
| 2005/0135259 A1 | 6/2005 | Yazdi et al. | |
| 2006/0045021 A1 * | 3/2006 | Deragon et al. ............. | 370/249 |
| 2006/0059163 A1 * | 3/2006 | Frattura et al. ............. | 707/10 |
| 2006/0114831 A1 * | 6/2006 | Buduma et al. ............. | 370/241 |
| 2006/0176880 A1 * | 8/2006 | Bare et al. .................. | 370/392 |
| 2006/0274647 A1 * | 12/2006 | Wang et al. ................. | 370/216 |
| 2007/0091827 A1 * | 4/2007 | Boers et al. ................. | 370/255 |
| 2007/0183415 A1 | 8/2007 | Fischer et al. | |
| 2007/0195761 A1 * | 8/2007 | Tatar et al. .................. | 370/389 |
| 2008/0095072 A1 * | 4/2008 | Shao et al. .................. | 370/254 |
| 2008/0123520 A1 * | 5/2008 | Ji et al. ....................... | 370/216 |
| 2008/0181147 A1 * | 7/2008 | Rydnell et al. .............. | 370/310 |
| 2008/0291928 A1 * | 11/2008 | Tadimeti et al. ............. | 370/401 |
| 2009/0129384 A1 * | 5/2009 | Regan ......................... | 370/390 |

OTHER PUBLICATIONS

U.S. Appl. No. 11/966,037, filed Dec. 28, 2007; Inventor: Dackary Ronald Busch, et al.

* cited by examiner

*Primary Examiner* — Xavier Szewai Wong
(74) *Attorney, Agent, or Firm* — Clements Bernard PLLC; Christopher L. Bernard; Lawrence A. Baratta, Jr.

(57) ABSTRACT

Packet switch operating methods and packet switches use a first port of forwarding circuitry of the packet switch to receive first packets and transmit second packets. The methods and packet switches mirror the first and second packets on a second port of the forwarding circuitry, encapsulate the mirrored packets with a transport identifier, and transmit the encapsulated packets using a third port of the forwarding circuitry.

26 Claims, 9 Drawing Sheets

902

| B-DA: x1234 |
| B-SA: xA010 |
| B-Tag: 1000 |
| I-Tag: 10 |
| C-DA: xABCD |
| C-SA: xDB00 |
| C-Tag: 200 |
| Data |
| FCS |

904

| B-DA: x1234 |
| B-SA: xA010 |
| B-Tag: 1000 |
| I-Tag: 10 |
| C-DA: xDB00 |
| C-SA: xABCD |
| C-Tag: 200 |
| Data |
| FCS |

Fig. 9

MODIFYING A DUPLICATED PACKET AND FORWARDING ENCAPSULATED PACKETS

RELATED APPLICATION DATA

This application is related to simultaneously filed U.S. patent application Ser. No. 11/966,037 entitled "Packet Loopback Methods and Replacing a Destination Address with a Source Address" and naming Dackary Ronald Busch, Kelly Donald Fromm, Keith Michael Bly, and Kevin Q. Daines as inventors.

TECHNICAL FIELD

The present invention, in various embodiments, relates to modifying a duplicated packet and forwarding encapsulated packets.

BACKGROUND OF THE INVENTION

Service providers are providing packet-based services to subscribers. In some cases, a subscriber may subscribe to a premium packet-based service advertised as having a committed data rate rather than a best-effort data rate. However, the rate at which a subscriber actually receives packets associated with the premium service may be influenced by congestion within the service provider's network, transmission control protocol settings, the manner in which the subscriber requests the packets, and other variables. To verify that the service provider's network is able to provide the service at the committed data rate, it may be desirable to monitor the service at a point in the service provider's network where the service provider delivers the service to the subscriber. However, sending a technician to physically monitor the service at the point using test equipment may be impractical.

BRIEF DESCRIPTION OF THE DRAWINGS

Preferred embodiments of the invention are described below with reference to the following accompanying drawings.

FIG. 9 is a chart depicting additional packets.

DETAILED DESCRIPTION OF THE PREFERRED EMBODIMENTS

Loopback and/or encapsulation techniques may be used at a point in a service provider network where a service is being delivered to a subscriber to verify that the service is being delivered to the subscriber according to agreed upon parameters.

According to one aspect of the invention, a packet switch operating method includes receiving a packet on a first port of the packet switch. The packet is addressed to a device that is in communication with a second port of the packet switch. The packet includes an Ethernet destination address field and an Ethernet source address field. The Ethernet destination address field includes a first address and the Ethernet source address field includes a second address. The first address may be an address of the device.

The method also includes first forwarding the packet to an output queue associated with the second port. The first forwarding may include forwarding the packet through a switching fabric of the packet switch and may alternatively or additionally include subjecting the packet to a congestion control algorithm implemented by the packet switch. The packet may survive the congestion control algorithm and the congestion control algorithm may include packet metering and/or packet shaping.

The method also includes second forwarding the packet from the output queue to the first port and modifying the packet so that the Ethernet destination address field includes the second address instead of the first address. The second forwarding may include forwarding the packet through a switching fabric of the packet switch.

Alternatively or additionally, the second forwarding may include transmitting the packet using the second port, subsequently receiving the packet using the second port, and subsequently, using the second port, forwarding the packet to the first port using a switching fabric of the packet switch. The modifying may include modifying subsequent to the transmitting and prior to the receiving the packet using the second port.

The device may be referred to as a first device and the receiving of the packet may include receiving the packet from a second device. The method may further include using the first port to transmit the packet to the second device subsequent to the second forwarding.

The method may also include storing the packet in the output queue until a moment in time when the second port is permitted to commence transmitting the packet. The second forwarding may include forwarding the packet to the first port subsequent to the storing. The modifying may include modifying the packet subsequent to the storing and prior to the second forwarding.

Figure 1:
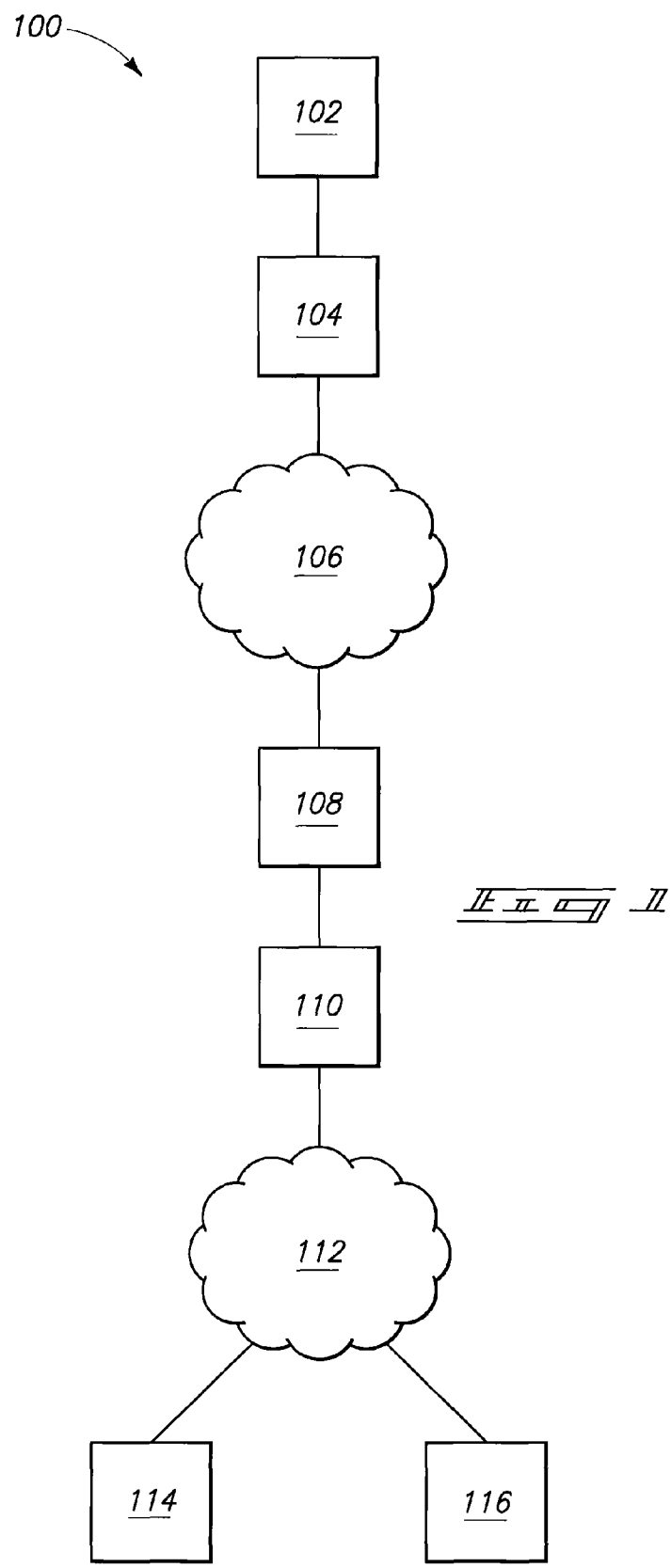
FIG. 1 is a schematic diagram of one configuration of a network.

FIG. 1 illustrates a network 100. Network 100 includes three packet switches 104, 108, and 110; two networks 106 and 112; and three devices 102, 114, and 116. In one configuration, packet switches 104 and 108 and device 102 may be operated by a first service provider, network 106 may be operated by a second service provider, and packet switch 110, network 112, and devices 114 and 116 may be operated by a subscriber.

The first service provider may provide a packet-based service (e.g., an Internet service, private local area network service, voice over internet protocol service, etc.) to the subscriber. In providing the service, the first service provider may relay packets from packet switch 104 to network 106. The second service provider may then relay the packets through network 106 to packet switch 108. Network 106 may include one or more packet switches, routers, or other devices.

The first service provider may forward the packets to the second service provider if, for example, the first service provider does not have facilities covering a particular geographical area. For example, packet switch 104 may be located in a first city and packet switch 108 may be located in a second city remote from the first city. If the first service provider does not have facilities connecting the first and second cities, the first provider may utilize network 106 (which is operated by the second service provider) to connect the first and second cities.

Packet switch 108 may forward the packets to packet switch 110, which may be operated by the subscriber. The packets may then be forwarded to a destination device, such as device 114 or device 116, based on destination addresses of the packets via network 112. Network 112 may be a local area network operated by the subscriber.

In providing a service to the subscriber, the first service provider may utilize a loopback function to verify that packets associated with the service are being forwarded to packet switch 110 or to troubleshoot forwarding problems.

Figure 2:
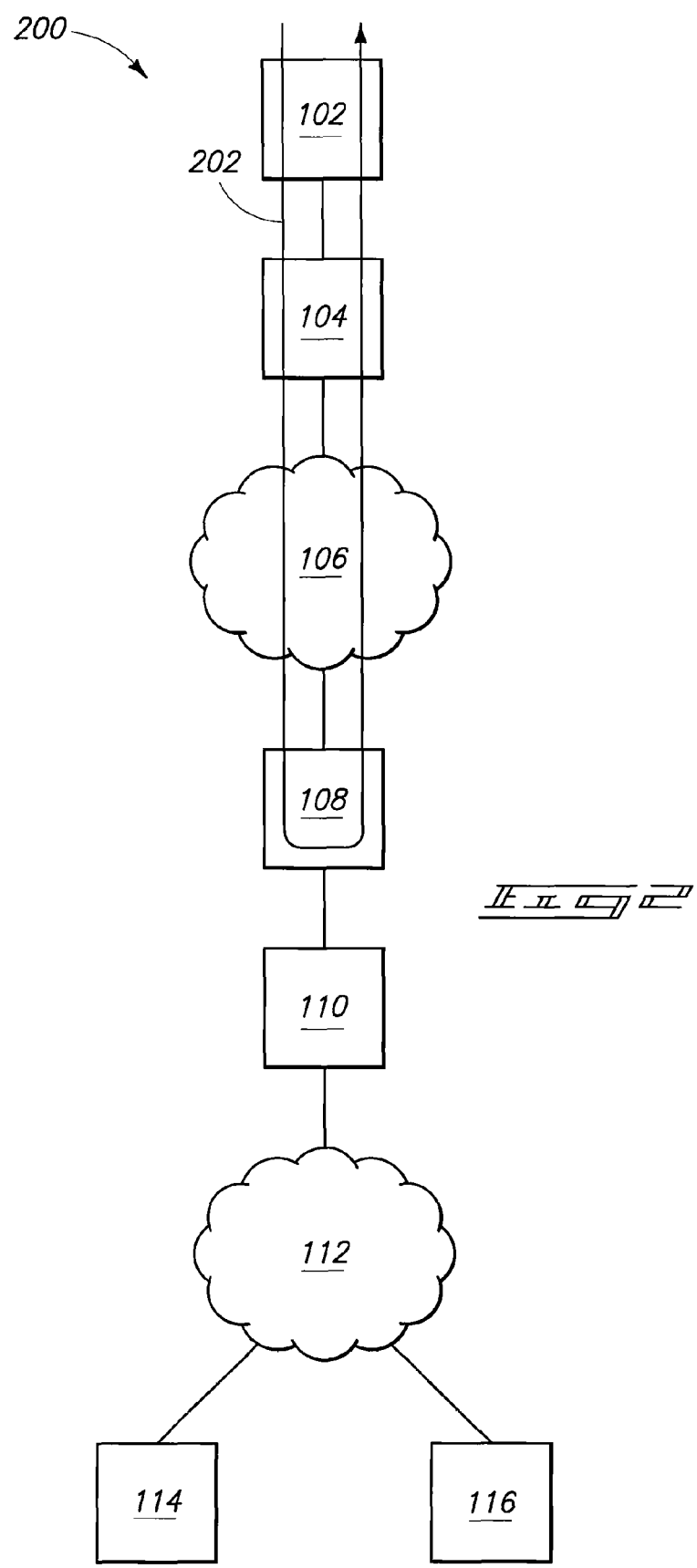
FIG. 2 is a schematic diagram of another configuration of a network.

FIG. 2 illustrates a network 200. Network 200 includes the devices of network 100 and additionally includes a loopback indicator 202 indicating that packet switch 108 is configured to provide a packet loopback. Packet switch 108 may be configured to loop back packets sent by device 102 that would have been forwarded to packet switch 110. For example, packet switch 108 may receive packets from network 106 and determine that the packets should be forwarded to packet switch 110.

However, instead of forwarding the packets to packet switch 110, packet switch 108 may instead forward the packets back to network 106. Network 106 may in turn forward the packets to packet switch 104, which may then forward the packets to device 102. In one configuration, packet switch 108 may loop packets back to network 106 on a per service basis. In other words, packet switch 108 may loop packets intended for packet switch 110 that are associated with a particular service but may forward packets intended for packet switch 110 that are associated with services other than the particular service to packet switch 110. Packets associated with a particular service may include a transport identifier associated with the particular service that enables the packet switches of network 200 to identify the packets as being associated with the particular service.

In another configuration, packet switch 108 may loop substantially all packets intended for packet switch 110 back to network 106. In yet another configuration, packet switch 108 may loop substantially all non-control packets intended for packet switch 110 back to network 106 but may forward control packets intended for packet switch 110 to packet switch 110.

By looping back packets at packet switch 108, the first service provider may be able to determine whether packets are reaching packet switch 110. For example, device 102 may send packets that are looped back and are received by device 102. Device 102 may then analyze the received packets with respect to the sent packets to determine whether packets are being lost. By looping the packets back just before they would have been transmitted by packet switch 108 to packet switch 110, device 102 may be able to determine which of the packets it sent would have been transmitted to packet switch 110 (and thus to the subscriber) had the loop back not been in place.

Of course, packets may be looped back at other locations in network 200. For example, packet switch 104 may be configured to loop packets it receives that are intended for network 106 back to device 102. Doing so may be useful in troubleshooting network problems. For example, if packet switch 108 is configured to loop back packets and device 102 sends packets but does not receive the packets back, the first service provider may conclude that a connectivity problem exists.

Next, the first service provider may configure packet switch 104 to loop back packets. If device 102 sends packets and receives the packets back due to the loopback configuration of packet switch 104, the first service provider may suspect that network 106 is preventing packets from reaching packet switch 108 and may consequently contact the second service provider to request that network 106 be repaired.

Figure 3:
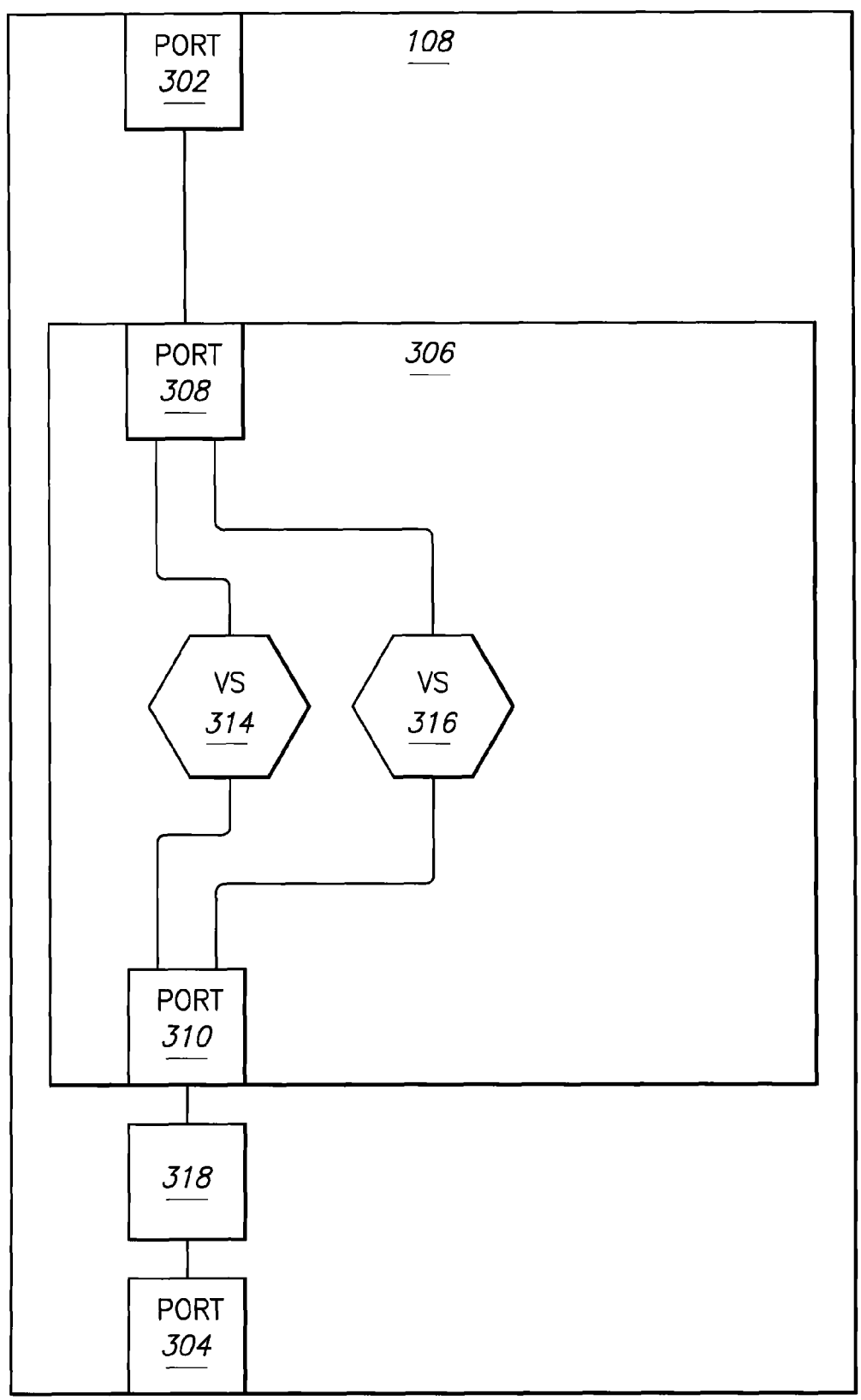
FIG. 3 is a logical block diagram of one configuration of a packet switch.

FIG. 3 illustrates a logical block diagram of packet switch 108. Packet switch 108 includes two ports 302 and 304 and forwarding circuitry 306. Forwarding circuitry 306 includes two ports 308 and 310 and two virtual switches 314 and 316. In some configurations, packet switch 108 may also include modification circuitry 318. Of course, packet switch 108 may include other ports and virtual switches, which are not illustrated for simplicity.

Forwarding circuitry 306 may itself be considered a packet switch within packet switch 108 since forwarding circuitry 306 forwards packets between ports of forwarding circuitry 306. Virtual switches 314 and 316 may create forwarding domains that restrict ports to which forwarding circuitry 306 may forward a packet associated with a virtual switch. In some configurations, upon receiving a packet, packet switch 108 may associate the packet with a virtual switch based on a transport identifier or other portion of the packet.

For example, packet switch 108 may associate the packet with a virtual switch based on a virtual local area network (VLAN) identifier, a multiprotocol label switching (MPLS) label, a service instance identifier (I-SID), a source address, a destination address, etc. By way of example, packet switch 108 may associate packets having a VLAN identifier value of 100 with virtual switch 314 and packets having a VLAN identifier value of 200 with virtual switch 316.

Port 302 may be connected to a device of network 106 and port 304 may be connected to packet switch 110. Packet switch 108 may be configured to receive packets on port 302 that were originally generated by device 102. The packets may be addressed to a device in communication with port 304 (e.g., device 114 or device 116). After receiving the packets, packet switch 108 may transmit the packets back to device 102 via port 302, network 106 and packet switch 104, thereby looping back the packets to device 102.

Prior to transmitting the packets back to device 102, packet switch 108 may modify the packets to be addressed to device 102 rather than being addressed to a device in communication with port 304. Doing so may enable network 106 and packet switch 104 to forward the modified packets back to device 102.

Figure 4:
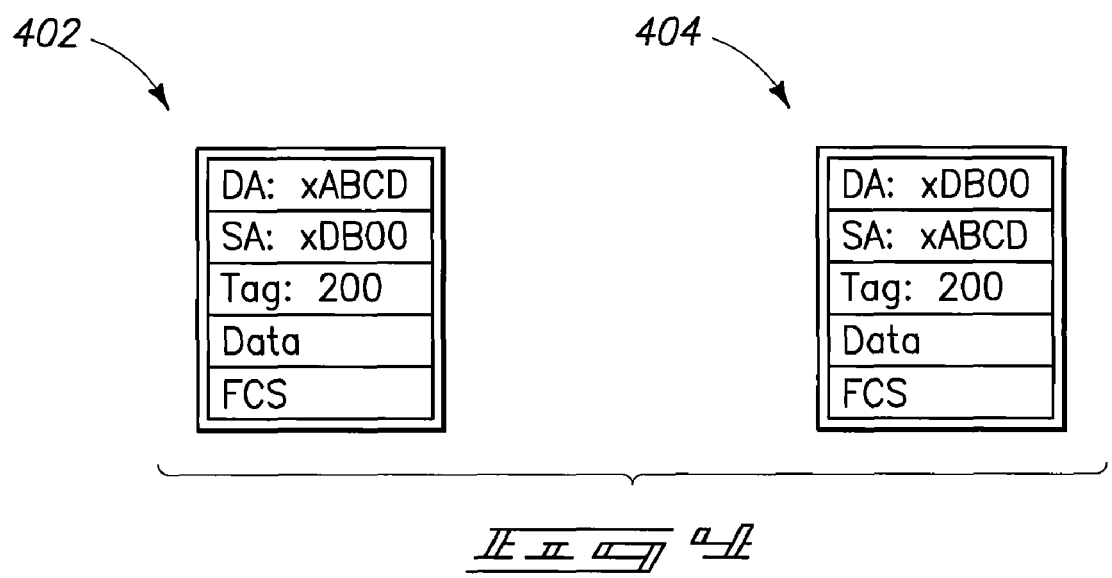
FIG. 4 is a chart depicting packets.

FIG. 4 is a chart illustrating two packets 402 and 404. Packet 402 has a format including an Ethernet destination address (DA) field, an Ethernet source address (SA) field, a VLAN identifier field, a data field, and a frame check sequence (FCS) field. Furthermore, packet 402 has an Ethernet destination address field value of "xABCD," an Ethernet source address field value of "xDB00," and a VLAN identifier field value of 200. Of course, actual Ethernet addresses may include more hexadecimal digits than the addresses depicted in FIG. 4. The addresses of FIG. 4 have been shortened for simplicity.

Packet 404 uses the same format as packet 402 since packet 404 has the same fields as packet 402. However, some of the values of the fields of packet 404 are different from the values of the fields of packet 402. Packet 404 has an Ethernet destination address field value of "xDB00," an Ethernet source address field value of "xABCD," and a VLAN identifier field value of 200. Thus, the Ethernet destination address and Ethernet source address of packet 404 are swapped with respect to packet 402.

Packet 402 may be a packet received by packet switch 108 on port 302, address "xABCD" may be an address of device 114, and address "xDB00" may be an address of device 102.

Packet 404 may be a looped back packet transmitted by packet switch 108 on port 302. Accordingly, packet 404 has a destination address of "xDB00," the address of device 102, and a source address of "xABCD," the address of device 114.

In some configurations, packet switch 108 may loop back packets associated with one virtual switch but not loop back packets associated with other virtual switches. Accordingly, packet switch 108 may loop back packets on a per virtual switch basis. For example, packet switch 108 may loop back packets associated with virtual switch 316 but might not loop back packets associated with virtual switch 314.

Figure 5:
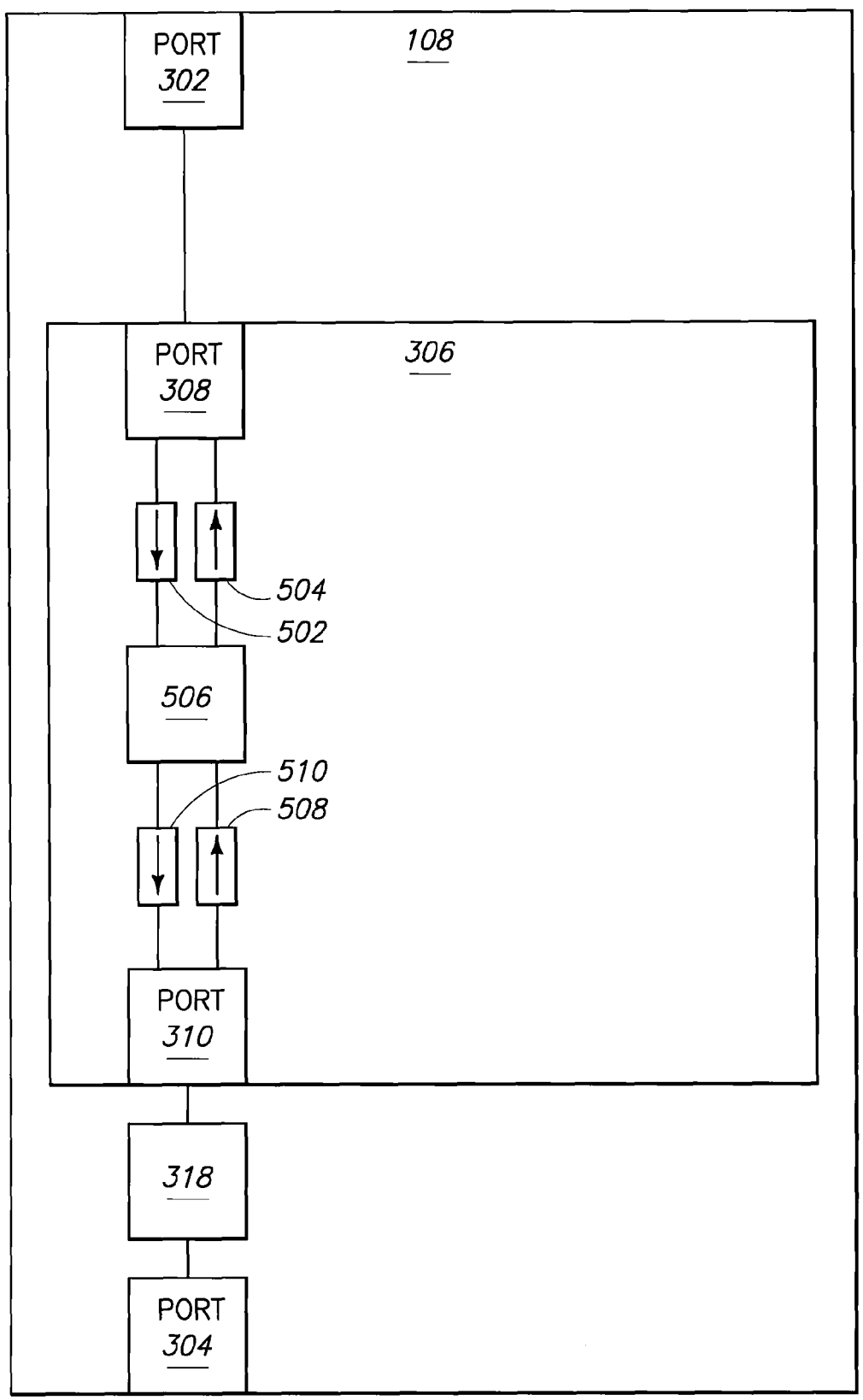
FIG. 5 is a block diagram of another configuration of a packet switch.

FIG. 5 is a block diagram of packet switch 108. FIG. 5 illustrates portions of forwarding circuitry 306 including a switching fabric 506, input storage circuitry 502 and 508, and output storage circuitry 504 and 510. As was mentioned above, forwarding circuitry 306 may include other ports, which are not illustrated for simplicity. Each of these other ports may be connected to input storage circuitry and output storage circuitry.

In one configuration, input storage circuitry 502, input storage circuitry 508, output storage circuitry 504, and output storage circuitry 510 may each include one or more queues used to store packets. Switching fabric 506 may be configured to forward packets from input storage circuitry 502 and 508 to output storage circuitry 504 and 510.

A packet received on port 302 may be forwarded to port 308 of forwarding circuitry 306 and stored in input storage circuitry 502 until forwarding circuitry 306 selects at least one destination port to which the packet should be forwarded from among the ports of forwarding circuitry 306.

After forwarding circuitry 306 selects a destination port, forwarding circuitry 306 may forward the packet to output storage circuitry of the destination port using switching fabric 506. For example, forwarding circuitry 306 may determine that a packet stored in input storage circuitry 502 should be forwarded to output storage circuitry 510 via switching fabric 506.

Some packets stored in input storage circuitry might not be forwarded to output storage circuitry due to congestion. A metering function may discard packets stored in input storage circuitry to relieve congestion. Similarly, some packets stored in output storage circuitry might not be transmitted out a port of forwarding circuitry 306 due to congestion. A shaping function may discard packets stored in output storage circuitry to relieve congestion. Other approaches to congestion control are possible.

In one configuration, packet switch 108 may receive a packet (e.g., packet 402) from network 106 on port 302 and forward the packet to port 308 of forwarding circuitry 306. The packet may originate from device 102 and may be addressed to device 114. Forwarding circuitry 306 may forward the packet to output storage circuitry 510 via input storage circuitry 502 and switching fabric 506. In doing so, the packet may be subjected to a congestion control algorithm implemented by forwarding circuitry 306. The fact that the packet is forwarded to output storage circuitry 510 may indicate that the packet has survived at least a metering congestion control algorithm associated with input storage circuitry 502.

Forwarding circuitry 306 may store the packet in output storage circuitry 510 until it is the packet's turn to be transmitted out port 310. However, when it is the packet's turn to be transmitted out port 310, instead of transmitting the packet out port 310, forwarding circuitry 306 may forward the packet to port 308 and transmit the packet via port 308 and port 302 to network 106. Consequently, the packet might not be transmitted out port 310. The fact that the packet is forwarded from output storage circuitry 510 to port 308 may indicate that the packet has survived a shaping congestion control algorithm associated with output storage circuitry 510.

In one configuration, forwarding circuitry 306 may forward the packet from output storage circuitry 510 to port 308 via input storage circuitry 508, switching fabric 506, and/or output storage circuitry 504. In doing so, the packet may be subjected to the congestion control algorithm implemented by forwarding circuitry 306.

Prior to transmitting the packet out port 308, forwarding circuitry 306 may modify the packet by replacing the Ethernet destination address of the packet with the Ethernet source address of the packet. For example, the packet may look like packet 402 prior to modification and may look like packet 404 subsequent to the modification. In one configuration, forwarding circuitry 306 may modify the packet prior to forwarding the packet from output storage circuitry 510 to port 308. More specifically, forwarding circuitry 306 may modify the packet prior to forwarding the packet from output storage circuitry 510 to switching fabric 506.

In another configuration, after forwarding circuitry 306 has forwarded the packet to output storage circuitry 510, forwarding circuitry 306 may transmit the packet to modification circuitry 318. Modification circuitry 318 may receive the packet, modify the received packet by replacing the Ethernet destination address of the packet with the Ethernet source address of the packet, and send the packet back to port 310. In this configuration, forwarding circuitry 506 need not be aware that the packet is being looped back since modification circuitry 318 may loop back the packet.

Modification circuitry 318 may be configured to loop back some packets it receives from port 310, but not all packets it receives from port 310. For example, modification circuitry 318 may be configured to loop back only packets having a particular transport identifier. Modification circuitry 318 may forward packets that are not looped back to port 304.

According to another aspect of the invention, a packet switch operating method includes receiving a packet on a first port of the packet switch. The packet is addressed to a device that is in communication with a second port of forwarding circuitry of the packet switch. The packet has an Ethernet destination address field and an Ethernet source address field. The Ethernet destination address field includes a first address and the Ethernet source address field includes a second address. The first address may be a unicast Ethernet address.

The method also includes first forwarding the packet to an output queue associated with a third port of the forwarding circuitry, second forwarding the packet from the output queue to the first port, and modifying the packet so that the Ethernet destination address field comprises the second address instead of the first address.

The second forwarding may include transmitting the packet out of the third port and receiving the packet at the third port without modifying the packet. Alternatively, the second forwarding may include transmitting the packet out of the third port and receiving the packet at the third port. The modifying may include modifying subsequent to the transmitting and before the receiving of the transmitted packet at the third port.

The device may be referred to as a first device and the packet may be referred to as a first packet. The first packet may be associated with a first service and the first packet may include a first transport identifier associated with the first service. In one configuration, the method may further include using the first port to receive a second packet addressed to a second device that is in communication with the second port.

The second packet may be associated with a second service that is different than the first service and the second packet may include a second transport identifier associated with the second service. The method may further include using the second port to forward the packet to the device.

In another configuration, the method may further include using the first port to receive a second packet addressed to a second device that is in communication with the second port. The second packet may be associated with a second service that is different than the first service and the second packet may include a second transport identifier associated with the second service. The method may further include forwarding the second packet to the output queue and forwarding the second packet from the output queue to the first port.

According to another aspect of the invention, a packet switch operating method includes receiving a packet from a first port of forwarding circuitry of the packet switch, modifying the received packet, forwarding the modified packet to the first port, receiving the modified packet from a second port of the forwarding circuitry, and, using a third port of the packet switch, transmitting the received modified packet.

The packet may include an Ethernet destination address field and an Ethernet source address field. The Ethernet destination address field may include a first address, the Ethernet source address field may include a second address, and the modifying may include modifying the packet so that the Ethernet destination address field includes the second address instead of the first address.

The modifying may include modifying the packet to include a transport identifier. The transport identifier may include one or more identifiers selected from among a Virtual Local Area Network (VLAN) identifier, a Multiprotocol Label Switching (MPLS) label, and a Service Instance Identifier (I-SID).

The packet may be referred to as a first packet and the first packet may be associated with a first service. The method may further include receiving a second packet associated with a second service from the first port, determining that the second packet is associated with the second service, and discarding the second packet.

According to another aspect of the invention, a packet switch operating method includes receiving a packet from a first port of forwarding circuitry of the packet switch. The packet has an Ethernet destination address field and an Ethernet source address field. The Ethernet destination address field includes a first address and the Ethernet source address field includes a second address.

The method also includes modifying the packet so that the Ethernet destination address field includes the second address instead of the first address and, using a second port of the packet switch in communication with the first port of the forwarding circuitry, transmitting the modified packet.

The modifying may include modifying a transport identifier of the packet, adding a transport identifier to the packet, or removing a transport identifier from the packet.

Figure 6:
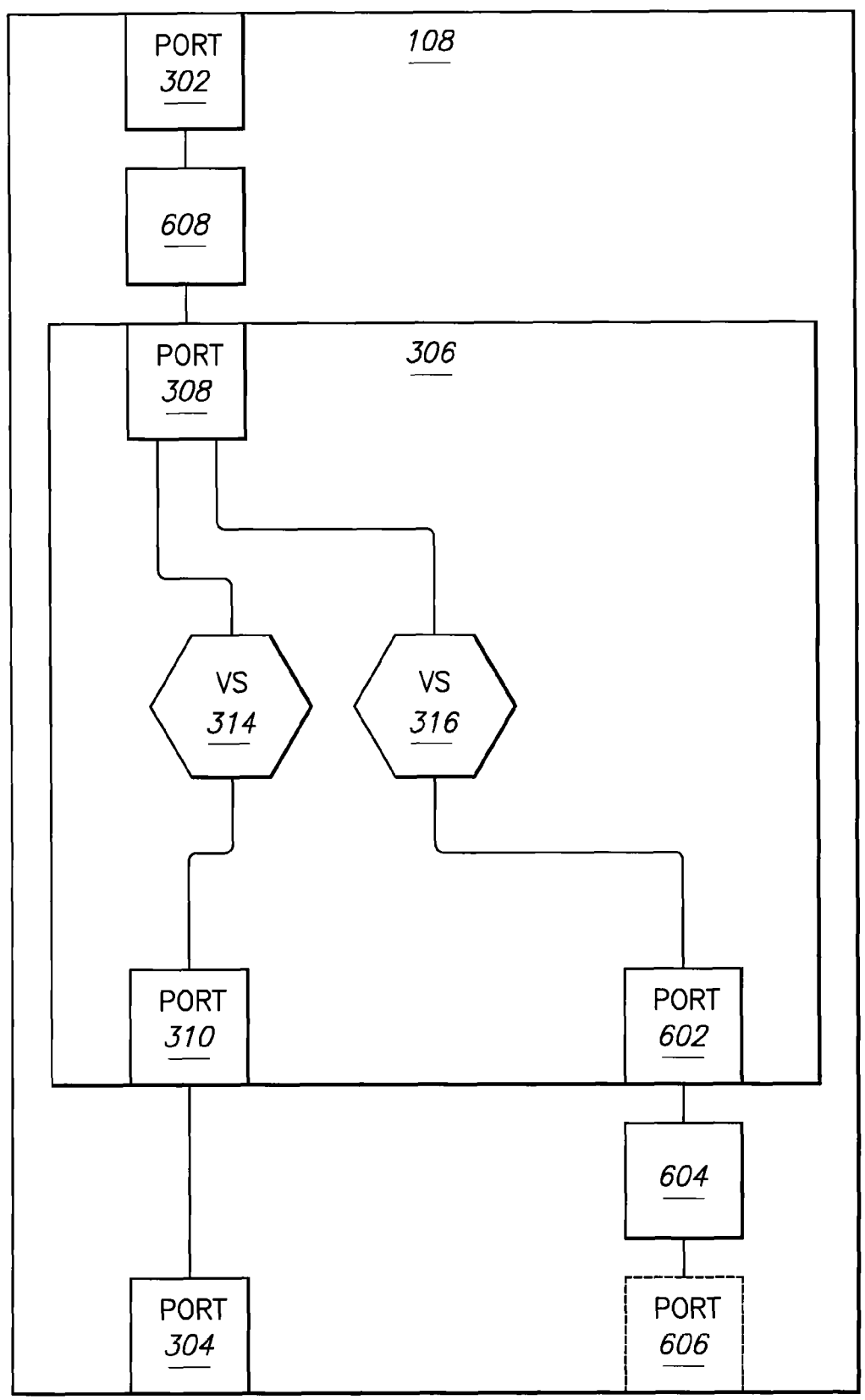
FIG. 6 is a logical block diagram of another configuration of a packet switch.

FIG. 6 is a logical block diagram illustrating another configuration of packet switch 108 in which packet switch 108 is configured to loop back packets received on port 302 that are addressed to a device in communication with port 304 (e.g., device 114 or device 116) and that are associated with virtual switch 316. In this configuration, instead of being logically connected to port 310, virtual switch 316 is logically connected to port 602.

Consequently, in contrast with the configuration of FIG. 5, forwarding circuitry 306 might not be able to forward packets associated with virtual switch 316 to port 310. Packets associated with virtual switch 314 might not be looped back in this configuration. Instead, packets received on port 302 that are associated with virtual switch 314 and are addressed to a device in communication with port 304 may be transmitted out of port 304.

As depicted in FIG. 6, forwarding circuitry 306 may include an additional port 602 and packet switch 108 may include: an additional port 606, modification circuitry 604, and/or modification circuitry 608. Port 602 may be reserved for loopback operations and might not be used to transmit packets when forwarding circuitry 306 is not configured to loop back packets. Port 606 may be configured in a loopback mode in which port 606 may function as a wire that provides packets received from port 602 or modification circuitry 604 to modification circuitry 604 or port 602. In some configurations, port 606 might not be externally accessible to a user of packet switch 108. Accordingly, a user might not be able to plug a cable into port 606. Port 606 is illustrated in phantom to represent these characteristics.

As is described below, modification circuitry 608 might not be present in some configurations of packet switch 108. If modification circuitry 608 is not present in a configuration, port 308 may be directly connected to port 302. Similarly, modification circuitry 604 might not be present in some configurations of packet switch 108. If modification circuitry 608 is not present in a configuration, port 602 may be directly connected to port 606.

Figure 7:
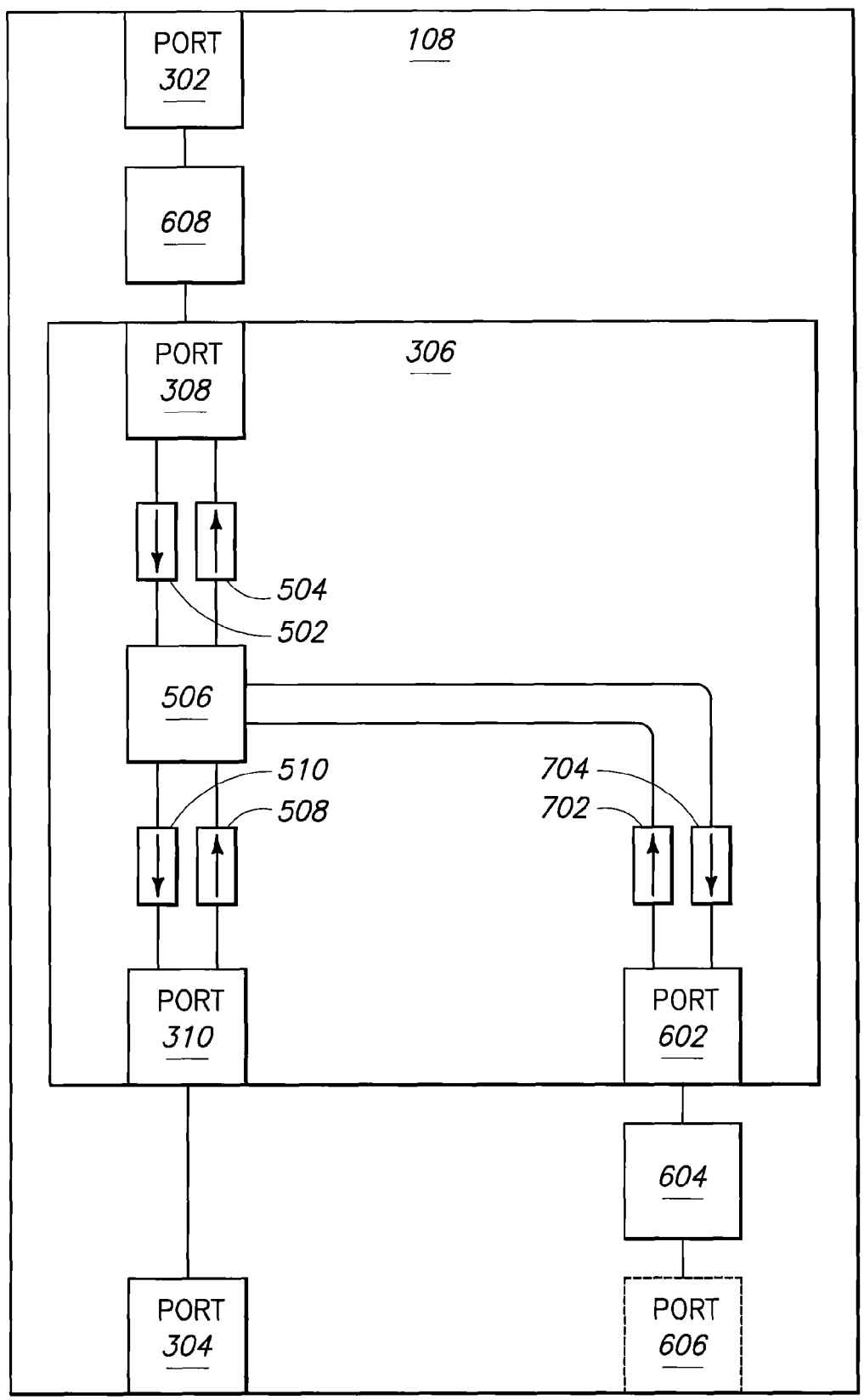
FIG. 7 is a block diagram of yet another configuration of a packet switch.

FIG. 7 is a block diagram of the configuration of packet switch 108 illustrated in FIG. 6. In this configuration, forwarding circuitry 306 additionally includes input storage circuitry 702 and output storage circuitry 704, which are both associated with port 602 and which are both connected to switching fabric 506. Input storage circuitry 702 may store packets received on port 602 until the received packets are forwarded to a destination port. Output storage circuitry 704 may store packets waiting to be transmitted out port 602.

In one configuration, packet switch 108 may receive a packet (e.g., packet 402) from network 106 on port 302 and may forward the packet to port 308. The packet may originate from device 102 and may be addressed to device 114. Forwarding circuitry 306 may forward the packet to output storage circuitry 704 via input storage circuitry 502 and switching fabric 506. In doing so, the packet may be subjected to a congestion control algorithm implemented by forwarding circuitry 306. The fact that the packet is forwarded to output storage circuitry 704 may indicate that the packet has survived at least a metering congestion control algorithm associated with input storage circuitry 502.

Forwarding circuitry 306 may store the packet in output storage circuitry 704 until it is the packet's turn to be transmitted out port 602. However, when it is the packet's turn to be transmitted out port 602, instead of transmitting the packet out port 602, forwarding circuitry 306 may forward the packet to port 308 and transmit the packet via port 308 and port 302 to network 106. Consequently, the packet might not be transmitted out port 602. The fact that the packet is forwarded from output storage circuitry 704 to port 308 may indicate that the packet has survived a shaping congestion control algorithm associated with output storage circuitry 704.

In one configuration, forwarding circuitry 306 may forward the packet from output storage circuitry 704 to port 308 via input storage circuitry 702, switching fabric 506, and/or output storage circuitry 504. In doing so, the packet may be subjected to the congestion control algorithm implemented by forwarding circuitry 306.

Prior to transmitting the packet out port 308, forwarding circuitry 306 may modify the packet by replacing the Ethernet destination address of the packet with the Ethernet source address of the packet. In some configurations, the Ethernet destination address may be a unicast address. By way of example, the packet may look like packet 402 prior to modification and may look like packet 404 subsequent to the modification. In one configuration, forwarding circuitry 306 may modify the packet prior to forwarding the packet to port 308. More specifically, forwarding circuitry 306 may modify the packet prior to forwarding the packet to switching fabric 506.

In this configuration, since the packet might not be transmitted out port 602, modification circuitry 604 and port 606 might not be present. Furthermore, modification circuitry 608 might not be present.

In another configuration, after forwarding circuitry 306 has forwarded the packet to output storage circuitry 704, port 602 may transmit the packet to modification circuitry 604. Modification circuitry 604 may receive the packet, modify the packet by replacing the Ethernet destination address of the packet with the Ethernet source address of the packet, and send the packet back to port 602. By way of example, the packet may look like packet 402 prior to the modification and may look like packet 404 subsequent to the modification. In this configuration, forwarding circuitry 306 need not be aware that the packet is being looped back since modification circuitry 604 may loop back the packet.

Modification circuitry 604 may be configured to loop back some packets it receives, but not all packets it receives. For example, modification circuitry 604 may be configured to modify and loop back packets having a particular transport identifier and to discard packets it receives that do not have the particular transport identifier. Upon receiving the looped back packet, forwarding circuitry 306 may forward the packet to port 308 via switching fabric 506.

In one configuration, modification circuitry 604 may be placed in a transmit path of port 602 and may modify packets it receives from port 602 by replacing the Ethernet destination address of the packet with the Ethernet source address of the packet and may then forward the modified packets to port 602 via port 606. Port 606 may be configured in the loopback mode and may provide packets it receives from modification circuitry 604 to port 602 without modifying the packets.

In another configuration of modification circuitry 604, port 606 may be configured in the loopback mode and may provide packets it receives from port 602 to modification circuitry 604 without modifying the received packets. Modification circuitry 604 may be placed in a receive path of port 602 and may modify packets it receives from port 602 via port 606 by replacing the Ethernet destination address of the packet with the Ethernet source address of the packet and may then forward the modified packets to port 602.

In another configuration, rather than replacing the Ethernet destination address of the packet with the Ethernet source address of the packet, modification circuitry 604 may modify the packet by adding a particular destination address to the packet so that the packet includes the particular destination address as well as the Ethernet destination address. Modification circuitry 604 may forward the modified packet to port 602, either directly or via port 606, and forwarding circuitry 306 may then forward the modified packet to port 308.

Port 308 may forward the modified packet to modification circuitry 608, which may remove the particular destination address of the modified packet and replace the Ethernet destination address of the packet with the Ethernet source address of the packet. Modification circuitry 608 may subsequently forward the modified packet to port 302.

Although the above configurations of packet switch 108 have been described with respect to looping back packets associated with virtual switch 316, packet switch 108 may additionally loop back packets associated with other virtual switches using the techniques described above.

In another configuration of packet switch 108, packet switch 108 might not include modification circuitry 604. In this configuration, port 606 may be configured in the loopback mode. Accordingly, port 602 may receive packets from port 606 that are identical to packets port 602 transmits to port 606. Upon receiving a packet from port 606, forwarding circuitry 306 may forward the packet to port 308 by relying on virtual switch 316 to flood the packet. Since the packet has not yet been modified to replace the Ethernet destination address of the packet with the Ethernet source address of the packet, the packet may have a destination address that is not associated with port 308. However, virtual switch 316 may still flood the packet to port 308.

Port 308 may forward the packet to modification circuitry 608, which may then modify the packet by replacing the Ethernet destination address of the packet with the Ethernet source address of the packet and forward the packet to port 302. By way of example, the packet may look like packet 402 prior to modification by modification circuitry 608 and may look like packet 404 subsequent to the modification.

According to another aspect of the invention, a packet switch operating method includes receiving a packet on a first port of the packet switch from a first device. The packet is addressed to a second device that is in communication with a second port of the packet switch and the packet has an Ethernet destination address field and an Ethernet source address field. The Ethernet destination address field includes a first address and the Ethernet source address field includes a second address.

The method also includes transmitting the packet using a first forwarding circuitry port in communication with the second port, duplicating the packet, modifying the duplicate so that the Ethernet destination address field includes the second address instead of the first address, and, using the first port of the packet switch, transmitting the modified duplicate to the first device.

The method may further include transmitting the duplicate packet using a second forwarding circuitry port. In one configuration, the method may further include discarding the packet transmitted using the first forwarding circuitry port.

The packet may be referred to as a first packet and the first packet may be associated with a first service. The method may further include receiving a second packet on the first port. The second packet may be associated with a second service and the second packet may be addressed to the second device. The method may further include transmitting the second packet using the first forwarding circuitry port, duplicating the second packet, transmitting the duplicate of the second packet using a second forwarding circuitry port, and discarding the transmitted duplicate of the second packet.

Figure 8:
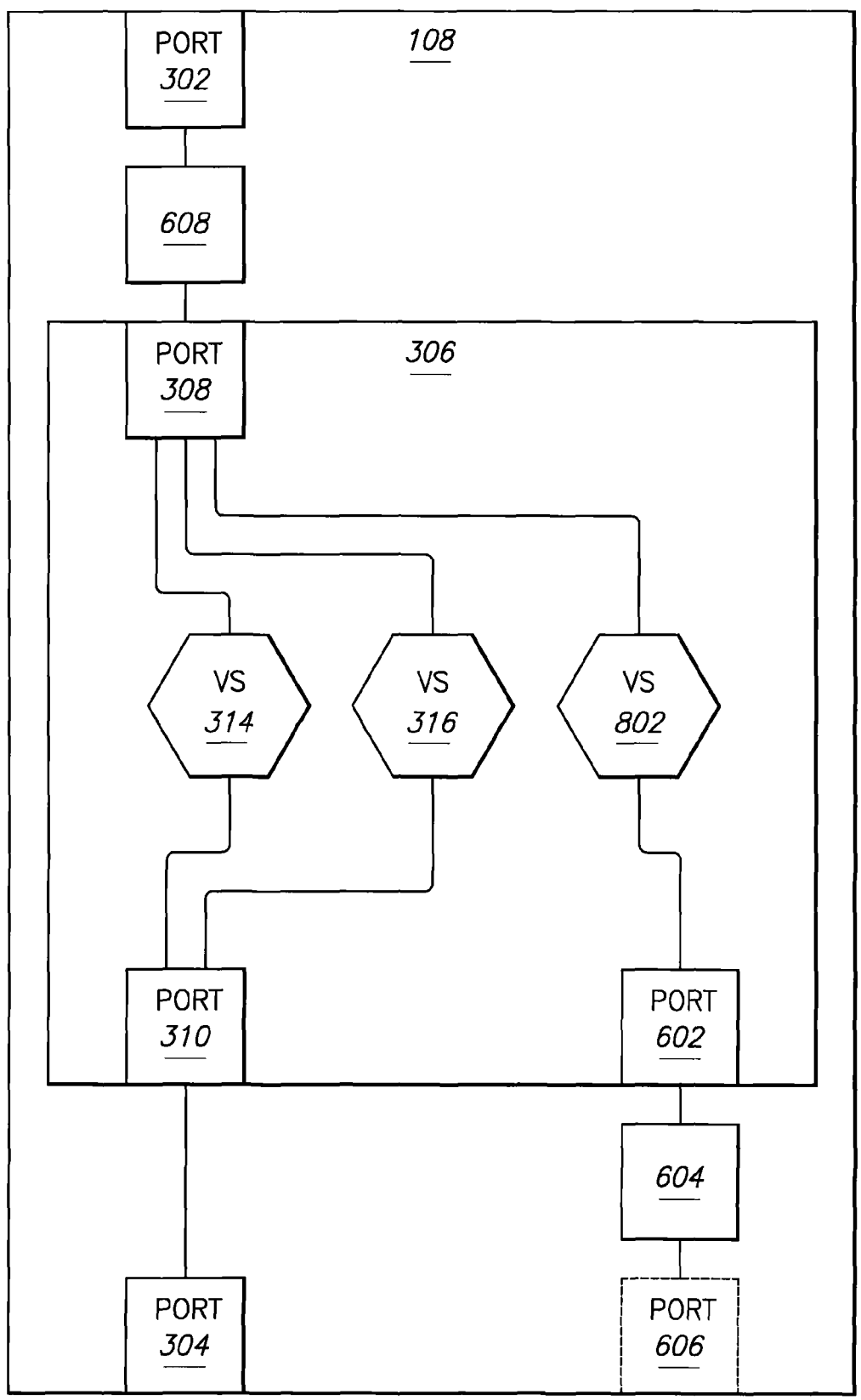
FIG. 8 is a logical block diagram of another configuration of a packet switch.

FIG. 8 is a logical block diagram illustrating another configuration of packet switch 108 in which forwarding circuitry 306 is configured to duplicate packets transmitted by port 310 and to transmit the duplicates out port 602. As depicted by FIG. 8, forwarding circuitry 306 includes an additional virtual switch 802.

In one configuration, packet switch 108 may receive a packet (e.g., packet 402) from network 106 on port 302 and may forward the packet to port 308. The packet may originate from device 102 and may be addressed to device 114. Forwarding circuitry 306 may determine that the packet is associated with virtual switch 316 and may forward the packet to port 310 and transmit the packet out port 310. The fact that the packet is transmitted by port 310 may indicate that the packet has survived a congestion control algorithm associated with forwarding circuitry 306. In one configuration, packet switch 108 may receive the packet from port 310 and transmit the packet out of port 304. In another configuration, packet switch 108 may receive the packet from port 310 and discard the packet so that the device to which the packet is addressed does not receive the packet.

In addition to transmitting the packet out of port 310, forwarding circuitry 306 may mirror the packet to port 602. In other words, forwarding circuitry 306 may duplicate the packet and transmit the duplicate out port 602. Using modification circuitry 604, port 606, and/or modification circuitry 608, packet switch 108 may subsequently modify the duplicate, forward the modified duplicate to port 302, and transmit the modified duplicate out of port 302 using one of the methods described above in relation to FIG. 7.

For example, modification circuitry 604 may receive the duplicate from port 302, modify the duplicate by replacing the Ethernet destination address of the packet with the Ethernet source address of the packet, and forward the modified duplicate to port 602. Forwarding circuitry 306 may then forward the modified duplicate to port 308 and packet switch 108 may then transmit the modified duplicate out of port 302.

Alternatively, in one configuration, packet switch 108 might not include modification circuitry 604. Thus, port 606 may receive the duplicate packet from port 602. Port 606 may be configured in the loopback mode. Consequently, port 602 may receive the duplicate back from port 606. After receiving the duplicate, forwarding circuitry 306 may add a transport identifier associated with virtual switch 802 to the duplicate and forward the duplicate to port 308. In some cases, the packet may include the transport identifier added by forwarding circuitry 306 in addition to an existing transport identifier present in the duplicate before the transport identifier associated with virtual switch 802 is added. Port 308 may forward the modified duplicate to modification circuitry 608. Modification circuitry 608 may remove the transport identifier from the modified duplicate, replace the Ethernet destination address of the packet with the Ethernet source address of the packet, and forward the packet to port 302.

In addition to mirroring a packet associated with virtual switch 316, forwarding circuitry 306 may additionally mirror packets associated with other virtual switches of forwarding circuitry 306 (e.g., virtual switch 314) that are transmitted out of port 310. Forwarding circuitry 306 may transmit these additionally mirrored packets out port 602. The mirrored packets may be looped back to port 302 using one of the methods described above. Alternatively, packet switch 108 may loop back only packets associated with virtual switch 316. Accordingly, packet switch 108 may discard mirrored packets transmitted by port 602 that are associated with virtual switches other than virtual switch 316.

According to another aspect of the invention, a packet processing device includes a first port, a second port, and forwarding circuitry. The forwarding circuitry is configured to receive a packet from the first port. The packet is addressed to a device that is in communication with the second port and the packet has an Ethernet destination address field including a unicast address. The forwarding circuitry is further configured to forward the packet to the second port, duplicate the packet, modify the duplicate to include a transport identifier, and forward the modified duplicate to the first port.

The device may further include a third port and the forwarding circuitry may be further configured to transmit the duplicate packet out the third port.

According to another aspect of the invention, a packet monitoring method includes configuring a packet switch to duplicate packets transmitted by a port of the packet switch, to encapsulate the duplicated packets, and to forward the encapsulated packets to a device in communication with the packet switch.

The method also includes, using the device, receiving the encapsulated packets, analyzing the received encapsulated packets, and, based on the analyzing, providing information about the encapsulated packets. The information may describe an amount of bandwidth consumed by the packets.

The packets may be associated with a first service and the method may further include configuring the packet switch to prevent packets transmitted by the port that are associated with any service other than the first service from being encapsulated.

According to another aspect of the invention, a packet switch operating method includes using a first port of forwarding circuitry of the packet switch to receive first packets and transmit second packets. The method also includes mirroring the first and second packets on a second port of the forwarding circuitry, encapsulating the mirrored packets with a transport identifier, and transmitting the encapsulated packets using a third port of the forwarding circuitry.

The mirroring may include duplicating the first and second packets and transmitting the duplicated first and second packets using the second port. The encapsulating may include encapsulating subsequent to the mirroring.

The second packets may be associated with a first service and the method may further include, using the first port, transmitting third packets associated with a second service, mirroring the third packets on the second port, and discarding the mirrored third packets subsequent to the mirroring.

According to another aspect of the invention, a packet switch operating method includes receiving a packet on a first port of the packet switch. The packet is addressed to a device that is in communication with a second port of the packet switch and the packet has an Ethernet destination address field comprising a unicast address.

The method also includes transmitting the packet using the second port, duplicating the packet, and modifying the duplicate to include a transport identifier.

Modifying the duplicate to include the transport identifier may include encapsulating the duplicate to include the transport identifier. The Ethernet destination address field may be referred to as a first Ethernet destination address field and the transport identifier may include a second Ethernet destination address field. The transport identifier may include one or more identifiers selected from among a Virtual Local Area Network (VLAN) identifier, a Multiprotocol Label Switching (MPLS) label, and a Service Instance Identifier (I-SID). In some configurations, the transport identifier may be associated with a packet tunnel.

The method also includes transmitting the modified duplicate using the first port, the second port, or a third port of the packet switch. The method may further include forwarding the packet through a switching fabric of the packet switch prior to the transmitting.

The packet may be referred to as a first packet, the device may be referred to as a first device, and the method may further include receiving a second packet on the second port. The second packet may be addressed to a second device that is in communication with the first port and the second packet may have an Ethernet destination address field comprising a unicast address.

The method may further include transmitting the second packet using the first port, duplicating the second packet, modifying the duplicate of the second packet to comprise the transport identifier, and transmitting the modified duplicate of the second packet using the first port or the third port.

The unicast address may be referred to as a first address and the packet may further include an Ethernet source address field including a second address. The method may further include modifying the duplicate so that the Ethernet destination address field includes the second address instead of the first address.

The packet may be referred to as a first packet and the first packet may be associated with a first service. The first packet may include a first transport identifier associated with the first service and the method may further include receiving a second packet on the first port. The second packet may be associated with a second service and may be addressed to a second device that is in communication with the second port. The first service may be different than the second service and the second packet may include a second transport identifier associated with the second service. The method may further include duplicating the second packet and discarding the second packet.

According to another aspect of the invention, a packet switch operating method includes receiving a plurality of packets from a port of forwarding circuitry of the packet switch, encapsulating the packets of the plurality that are associated with a selected service, forwarding the encapsulated packets to the port, and discarding the packets of the plurality that are not associated with the selected service.

The packets of the plurality that are associated with the selected service may include a transport identifier associated with the selected service. Prior to the encapsulating, the plurality of packets may include a first Ethernet destination address field and the encapsulating may include adding a second Ethernet destination address field to the packets of the plurality that are associated with the selected service. The encapsulating may include adding one or more identifiers selected from among a Virtual Local Area Network (VLAN) identifier, a Multiprotocol Label Switching (MPLS) label, and a Service Instance Identifier (I-SID) to the packets of the plurality that are associated with the selected service.

The port may be referred to as a first port, the plurality of packets may be referred to as a first plurality of packets, and the first plurality of packets may be a duplicate of a second plurality of packets transmitted by a second port of the forwarding circuitry.

Returning now to FIG. 1, in some cases it may be beneficial for the first service provider to monitor packets received by the subscriber at packet switch 110. For example, the subscriber may have subscribed to a packet service having a particular rate guarantee. If the subscriber accuses the first service provider of providing the service at less than the particular rate, the first service provider may initially perform a loopback test using the techniques described above to loopback a packet service just prior to forwarding packets of the service to packet switch 110.

However, results from an intrusive loopback using the techniques described above might not adequately represent the actual quality or bandwidth of the service received by packet switch 110. For example, the actual bandwidth of the service received by packet switch 110 may be influenced by the operation of transmission control protocol (TCP) sessions relayed by packets of the packet service and the intrusive loopback test might not simulate the influence of the TCP sessions.

Instead of, or in addition to using an intrusive loopback test to monitor packets received by packet switch 110, packet switch 108 may receive first packets from network 106 that are associated with a service, duplicate the first packets, encapsulate the first packets, and forward the encapsulated first packets to a device configured to analyze the encapsulated first packets. Additionally or alternatively, packet switch 108 may receive second packets from packet switch 110 that are associated with the service, duplicate the second packets, encapsulate the second packets, and forward the encapsulated second packets to the device.

For example, packet switch 108 may forward the encapsulated first packets and/or the encapsulated second packets to device 102. By way of example, device 102 may perform analysis such as: determining a rate at which packet switch 110 received the first packets, determining whether the second packets requested the first packets, determining TCP windows used by the first and second packets, determining a rate at which packet switch 110 received the second packets, and determining a retransmission rate associated with the first packets and/or the second packets. Device 102 may subsequently provide information describing the analysis to the first service provider.

In one configuration, packet switch 108 may duplicate, encapsulate, and forward packets to device 102 that are associated with one service and prevent packets associated with another service from being duplicated, encapsulated, and forwarded to device 102.

To decrease the number of encapsulated packets that may be dropped while being forwarded from packet switch 108 to device 102, packet switch 104 and network 106 may be configured to protect the encapsulated packets against being discarded. For example, packet switch 104 and network 106 may be configured to reserve a particular amount of bandwidth for forwarding the encapsulated packets. Additionally, or alternatively, packet switch 104 and network 106 may treat the encapsulated packets as high priority packets.

Referring now to FIG. 8, in one configuration, packet switch 108 may receive a packet (e.g., packet 402) from network 106 on port 302 and may forward the packet to port 308. The packet may be addressed, using a unicast Ethernet address, to device 114. Forwarding circuitry 306 may determine that the packet is associated with virtual switch 316 and may transmit the packet out port 310. Packet switch 108 may then transmit the packet out port 304.

In addition to transmitting the packet out port 310, forwarding circuitry 306 may mirror the packet to port 602 by duplicating the packet and transmitting the duplicate out port 602. Using modification circuitry 604, port 606, and/or modification circuitry 608, packet switch 108 may subsequently modify the duplicate to include a transport identifier. In some cases, packet switch 108 may also modify the duplicate by replacing an Ethernet destination address of the duplicate with an Ethernet source address of the duplicate. In modifying the duplicate, packet switch 108 may encapsulate the duplicate using the transport identifier. In other words, packet switch 108 may add the transport identifier to the duplicate without deleting existing fields of the duplicate.

Network 100 may subsequently use the transport identifier to forward the modified duplicate to device 102 so that device 102 may analyze the modified duplicate. For example, a packet tunnel may be established between packet switch 108 and device 102 that relays packets from packet switch 108 to device 102. In this example, packet switch 104 and network 106 may be configured to facilitate the packet tunnel. The tunnel may relay only packets conforming to the 802.1Qay standard. Accordingly, the modified duplicate may conform to the 802.1Qay standard.

FIG. 9 illustrates two packets 902 and 904. Packets 902 and 904 may conform to the 802.1Qay provider backbone transport—traffic engineering standard and/or the 802.1ah provider backbone bridging standard. Prior to modification, the duplicate may look like packet 402. Subsequent to the modification, the duplicate may look like packet 902 if the modification does not include replacing the Ethernet destination address of the duplicate with the Ethernet source address of the duplicate and may look like packet 904 if the modification does include replacing the Ethernet destination address of the duplicate with the Ethernet source address of the duplicate.

Note that in addition to the transport identifier, the fields of packet 402 are present in packet 902. The transport identifier includes an Ethernet backbone destination address (B-DA), an Ethernet backbone source address (B-SA), a backbone tag (B-Tag), and a service instance tag (I-Tag). The fields of packet 402 are present in packet 902, but are labeled differently than in FIG. 4. In packet 902, the customer destination address (C-DA) is the destination address of packet 402, the customer source address (C-SA) is the source address of packet 402, and the customer tag (C-Tag) is the tag of packet 402.

In one configuration, device 102 may be a first endpoint of the packet tunnel. Accordingly, the B-DA of packet 902 may be the address of device 102 and the B-SA of packet 902 may be the address of packet switch 108, which may be a second endpoint of the packet tunnel.

Of course, the transport identifier added to the duplicate by packet switch 108 may take forms other than those illustrated in FIG. 9. The transport identifier may include one or more of a VLAN identifier, an MPLS label, or an I-SID. In one configuration, the transport identifier may be a VLAN identifier. In this configuration, the duplicate may include a VLAN identifier prior to modification. Consequently, after modification, the duplicate may include two VLAN identifiers.

Returning now to FIG. 8, packet switch 108 may transmit the modified duplicate out port 302 so that the modified duplicate may be forwarded to device 102. In an alternative configuration, the modified duplicate may be forwarded to a device that is in communication with an additional port (not illustrated) of packet switch 108 other than port 302 or port 304. Accordingly, packet switch 108 may transmit the modified packet out the additional port. Thus, the modified duplicate need not be forwarded out the port from which the packet upon which the duplicate is based was received.

Packet switch 108 may modify the duplicate as described above using one of several techniques. In one configuration, modification circuitry 604 may receive the duplicate from port 602 and modify the duplicate to include the transport identifier. In this configuration, port 606 may be configured in the loopback mode discussed above and may be used to receive the duplicate from port 602 and provide the duplicate to modification circuitry 604 if modification circuitry 604 is in the receive path of port 602. Alternatively, port 606 may be used to receive the modified duplicate from modification circuitry 604 and provide the modified duplicate to port 602 if modification circuitry 604 is in the transmit path of port 602.

Alternatively, modification circuitry 604 may receive the duplicate, modify the duplicate, and forward the modified duplicate to port 602 without relying on port 606. Upon receiving the modified duplicate at port 602, forwarding circuitry 306 may forward the modified duplicate to port 308 via switching fabric 506. Packet switch 108 may then transmit the modified duplicate out port 302 (or out the additional port described above).

In another configuration, packet switch 108 might not include modification circuitry 604 but port 602 may still transmit the duplicate packet. In this configuration, port 606 (in the loopback mode) may receive the duplicate packet from port 602 and loop the duplicate packet back to port 602. After receiving the looped duplicate, forwarding circuitry 306 may add a transport identifier associated with virtual switch 802 to the duplicate and flood the duplicate to port 308. Port 308 may forward the duplicate to modification circuitry 608. Modification circuitry 608 may remove the transport identifier associated with virtual switch 802, add the transport identifier associated with device 102, and, in some cases, replace the Ethernet destination address of the packet with the Ethernet source address of the packet. Modification circuitry 608 may then forward the modified duplicate to port 302.

In another configuration, modification circuitry 604 may receive the duplicate directly from port 602 or from port 602 via port 606 (in the loopback mode) and modify the duplicate by adding a particular destination address to the duplicate so that the duplicate includes the particular destination address as well as the Ethernet destination address. Modification circuitry 604 may forward the duplicate to port 602, either directly or via port 606, and forwarding circuitry 306 may then forward the duplicate to port 308.

Port 308 may forward the duplicate to modification circuitry 608, which may remove the particular destination address of the duplicate. Modification circuitry 608 may modify the duplicate to include the transport identifier and in some cases may replace the Ethernet destination address of the packet with the Ethernet source address of the packet. Modification circuitry 608 may subsequently forward the modified duplicate to port 302.

The above discussion has centered on a packet received by port 302 being duplicated, modified, and transmitted back out port 302. Packet switch 108 may perform similar operations on packets received on other ports of packet switch 108. For example, packet switch 108 may receive packets on port 304 and transmit the packets out port 302. Packet switch 108 may duplicate these packets, modify the duplicates, and transmit the modified duplicates out port 302.

A network operator may analyze the modified duplicates and may thereby obtain information regarding packets being received on port 304 that are transmitted out port 302 (e.g., bandwidth information). The network operator may compare the packets received on port 304 that are transmitted out port 302 to packets received on port 302 that are transmitted out port 304. The comparison may provide information such as the number of retransmission requests for which a response is received and/or the amount of time between a retransmission request and a response. Furthermore, the comparison may enable the network operator to determine whether the bandwidth of the service to packet switch 110 is symmetrical with the bandwidth of the service from packet switch 110 or whether the bandwidth is significantly larger in one direction.

Packet switch 108 may receive a packet from packet switch 110 on port 304 and may forward the packet to port 310. The packet may be addressed to a device in communication with port 302 with a unicast Ethernet destination address. Forwarding circuitry 306 may determine that the packet is associated with virtual switch 316 and may transmit the packet out port 308. Packet switch 108 may then transmit the packet out port 302.

In addition to transmitting the packet out port 308, forwarding circuitry 306 may mirror the packet to port 602 by duplicating the packet and transmitting the duplicate out port 602. Using forwarding circuitry 306, modification circuitry 604, port 606, and/or modification circuitry 608 in one of the configurations described above, packet switch 108 may subsequently modify the duplicate to include a transport identifier. In some cases, packet switch 108 may also modify the duplicate by replacing an Ethernet destination address of the duplicate with an Ethernet source address of the duplicate. Packet switch 108 may then transmit the modified duplicate out port 302. Alternatively or additionally, packet switch 108 may transmit the modified duplicate out the additional port described above or out port 304.

The method of duplicating, modifying, and transmitting a modified duplicate described above in relation to virtual switch 316 may alternatively or additionally be used with other virtual switches of forwarding circuitry 306. For example, packet switch 108 may receive a packet from network 106 on port 302 and may forward the packet to port 308. The packet may be addressed to a device in communication with port 304. Forwarding circuitry 306 may determine that the packet is associated with virtual switch 314 and may transmit the packet out port 310. Packet switch 108 may then transmit the packet out port 304.

In addition to transmitting the packet out port 304, forwarding circuitry 306 may mirror the packet to port 602 by duplicating the packet and transmitting the duplicate out port 602. Using forwarding circuitry 306, modification circuitry 604, port 606, and/or modification circuitry 608 in one of the configurations described above, packet switch 108 may subsequently modify the duplicate to include a transport identifier. The transport identifier may be associated with virtual switch 314 and may be different from a transport identifier associated with virtual switch 316. In some cases, packet switch 108 may also modify the duplicate by replacing an Ethernet destination address of the duplicate with an Ethernet source address of the duplicate. Packet switch 108 may then transmit the modified duplicate out port 302.

In some configurations, forwarding circuitry 306 may mirror substantially all packets transmitted by port 310 to port 602. Modification circuitry 604 may receive these mirrored packets, may modify a subset of the mirrored packets associated with a particular virtual switch, and may forward the modified mirrored packets to port 602. Modification circuitry 604 may discard mirrored packets not associated with the particular virtual switch.

According to another aspect of the invention, an article of manufacture includes media including programming configured to cause processing circuitry (e.g., a microprocessor) to perform processing that executes one or more of the methods described above. The programming may be embodied in a computer program product(s) or article(s) of manufacture, which can contain, store, or maintain programming, data, and/or digital information for use by or in connection with an instruction execution system including processing circuitry. In some cases, the programming may be referred to as software, hardware, or firmware.

For example, the media may be electronic, magnetic, optical, electromagnetic, infrared, or semiconductor media. Some more specific examples of articles of manufacture including media with programming include, but are not limited to, a portable magnetic computer diskette (such as a floppy diskette or a ZIP® disk manufactured by the Iomega Corporation of San Diego, Calif.), hard drive, random access memory, read only memory, flash memory, cache memory, and/or other configurations capable of storing programming, data, or other digital information.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A packet switch operating method comprising:
   using a first port of forwarding circuitry of the packet switch, the packet switch receiving first packets and transmitting second packets;
   the packet switch mirroring the first and second packets and transmitting the mirrored first and second packets on a second port of the forwarding circuitry;
   the packet switch looping the mirrored first and second packets transmitted on the second port of the forwarding circuitry back to the second port of the forwarding circuitry;
   the packet switch encapsulating the mirrored packets with a transport identifier, wherein the encapsulating comprises adding the transport identifier in addition to existing fields in the mirrored packets;
   after the looping, the packet switch transmitting the encapsulated packets using a third port of the forwarding circuitry; and
   using the encapsulated packets at a device associated with a first service provider to analyze the quality of a selected service provided by the first service provider.

2. The method of claim 1 wherein the mirroring comprises duplicating the first and second packets and transmitting the duplicated first and second packets using the second port.

3. The method of claim 2 wherein the encapsulating comprises encapsulating subsequent to the mirroring.

4. The method of claim 1 wherein the second packets are associated with a first service and further comprising:
   using the first port, transmitting third packets associated with a second service, the third packets comprising unicast destination addresses; mirroring the third packets on the second port; and discarding the mirrored third packets subsequent to the mirroring.

5. The method of claim 1 wherein the packet switch encapsulates the mirrored packets after the transmitting of the mirrored first and second packets on the second port and before the looping of the mirrored first and second packets back to the second port.

6. The method of claim 1 wherein the packet switch encapsulates the mirrored packets after the looping of the mirrored first and second packets back to the second port.

7. The method of claim 1 wherein the forwarding circuitry comprises a virtual switch disposed within the packet switch.

8. A packet switch comprising forwarding circuitry configured to implement the method of claim 1.

9. A packet switch operating method comprising:
   receiving a packet on a first port of the packet switch, the packet being addressed to a device that is in communication with a second port of the packet switch and the packet having an Ethernet destination address field comprising a first address and an Ethernet source address field comprising a second address;
   using the second port, transmitting the packet;
   duplicating the packet;
   modifying the duplicate so that the Ethernet destination address field comprises the second address instead of the first address;
   modifying the duplicate to comprise a transport identifier, wherein the modifying comprises adding the transport identifier in addition to existing fields in the duplicate;
   using the first port, the second port, or a third port of the packet switch, transmitting the modified duplicate; and using the modified duplicate at a device associated with a first service provider to analyze the quality of a selected service provided by the first service provider.

10. The method of claim 9 wherein the packet comprises a first packet, the device comprises a first device, and further comprising:
receiving a second packet on the second port, the second packet being addressed to a second device that is in communication with the first port and the second packet having an Ethernet destination address field comprising a unicast address;
using the first port, transmitting the second packet;
duplicating the second packet;
modifying the duplicate of the second packet to comprise the transport identifier; and
using the first port or the third port, transmitting the modified duplicate of the second packet.

11. The method of claim 9 wherein the Ethernet destination address field comprises a first Ethernet destination address field and the transport identifier comprises a second Ethernet destination address field.

12. The method of claim 9 wherein the transmitting comprises transmitting using the first port.

13. The method of claim 9 wherein the transmitting comprises transmitting using the second port.

14. The method of claim 9 wherein the transport identifier comprises one or more identifiers selected from among a Virtual Local Area Network (VLAN) identifier, a Multiprotocol Label Switching (MPLS) label, and a Service Instance Identifier (I-SID).

15. The method of claim 9 wherein the packet comprises a first packet, the first packet is associated with a first service, the first packet comprises a first transport identifier associated with the first service and further comprising:
receiving a second packet on the first port, the second packet being associated with a second service and addressed to a second device that is in communication with the second port, the first service being different than the second service and the second packet comprising a second transport identifier associated with the second service, wherein the second packet comprises a unicast destination address;
duplicating the second packet; and
discarding the second packet.

16. The method of claim 9 further comprising transmitting the duplicate packet on a port of forwarding circuitry of the packet switch and then looping the duplicate packet back to the port of the forwarding circuitry.

17. A packet monitoring method comprising:
configuring a packet switch to duplicate packets transmitted by a port of the packet switch, to encapsulate the duplicated packets comprising adding information in addition to existing fields in the duplicated packets, and to forward the encapsulated packets to a device in communication with the packet switch and associated with a first service provider;
using the device, receiving the encapsulated packets;
analyzing the quality of a selected service provided by the first service provider using the received encapsulated packets; and
based on the analyzing, providing information about the encapsulated packets, wherein the information describes an amount of bandwidth consumed by the packets, and wherein the information comprises transmission control protocol session information.

18. The method of claim 17 wherein the packets are associated with a first service and further comprising configuring the packet switch to prevent packets transmitted by the port that are associated with any service other than the first service from being encapsulated.

19. The method of claim 17:
wherein the packets are first packets;
wherein the encapsulated packets are encapsulated first packets;
further comprising configuring the packet switch to duplicate second packets received by the port, to encapsulate the duplicated second packets, and to forward the encapsulated second packets to the device;
wherein the analyzing comprises comparing an amount of bandwidth consumed by the encapsulated first packets with an amount of bandwidth consumed by the encapsulated second packets; and
wherein the providing of the information comprises providing information related to the comparing.

20. The method of claim 17 wherein the information describes a rate at which the packet switch transmitted the packets.

21. The method of claim 17 wherein the information describes a retransmission rate of the transmitted packets.

22. A packet switch operating method comprising:
modification circuitry of a packet switch receiving a plurality of packets from a port of forwarding circuitry of the packet switch, each packet of the plurality comprising a transport identifier field added by the forwarding circuitry in addition to existing fields in the packet, wherein the forwarding circuitry comprises a virtual switch disposed within the packet switch;
the modification circuitry inspecting the transport identifier fields of the plurality of packets;
the modification circuitry determining, based on the inspecting, that a first set of the packets of the plurality is associated with a selected service and that a second set of the packet of the plurality is not associated with the selected service;
encapsulating the packets of the first set;
forwarding the encapsulated packets to the port;
discarding the packets of the second set; and
using the encapsulated packets at a device associated with a first service provider to analyze the quality of the selected service provided by the first service provider.

23. The method of claim 22 wherein the port is a first port, the plurality of packets is a first plurality of packets, and the first plurality of packets is a duplicate of a second plurality of packets transmitted by a second port of the forwarding circuitry.

24. The method of claim 22 wherein prior to the encapsulating, the plurality of packets comprise a first Ethernet destination address field and the encapsulating comprises adding a second Ethernet destination address field to the packets of the plurality that are associated with the selected service.

25. The method of claim 22 wherein the encapsulating comprises adding one or more identifiers selected from among a Virtual Local Area Network (VLAN) identifier, a Multiprotocol Label Switching (MPLS) label, and a Service Instance Identifier (I-SID) to the packets of the plurality that are associated with the selected service.

26. A packet processing device comprising:
a first port;
a second port;
forwarding circuitry configured to:
receive a packet from the first port, the packet being addressed to a device that is in communication with the second port and the packet having an Ethernet destination address field comprising a first address and an Ethernet source address field comprising a second address;

forward the packet to the second port;

duplicate the packet;

modify the duplicate so that the Ethernet destination address field comprises the second address instead of the first address;

modify the duplicate to comprise a transport identifier, wherein to modify comprises adding the transport identifier in addition to existing fields in the duplicate; and forward the modified duplicate to the first port; and a device associated with a first service provider using the modified duplicate to analyze the quality of a selected service provided by the first service provider.

* * * * *